United States Patent [19]
Freyberger

[11] Patent Number: 4,691,226
[45] Date of Patent: Sep. 1, 1987

[54] COLOR-TELEVISION RECEIVER WITH AT LEAST ONE INTEGRATED CIRCUIT FOR PROCESSING THE DIGITIZED COMPOSITE COLOR SIGNAL

[75] Inventor: Laurin C. Freyberger, Endingen, Fed. Rep. of Germany

[73] Assignee: Deutsche ITT Industries GmbH, Freiburg, Fed. Rep. of Germany

[21] Appl. No.: 791,345

[22] Filed: Oct. 25, 1985

[30] Foreign Application Priority Data

Nov. 2, 1984 [EP] European Pat. Off. ...... 8 411 3205.3

[51] Int. Cl.[4] .............................................. H04N 9/70
[52] U.S. Cl. ...................................... 358/26; 358/19; 358/158
[58] Field of Search ...................... 358/26, 158, 19, 27, 358/21 R, 10, 139

[56] References Cited

U.S. PATENT DOCUMENTS 4,415,919 11/1983 Miyasako et al. ...................... 358/27
4,488,170 12/1984 Nillesen .................................. 358/26
4,491,862 1/1985 Flamm .................................... 358/19
4,561,014 12/1985 Douziech et al. ...................... 358/19

Primary Examiner—James J. Groody
Assistant Examiner—David E. Harvey
Attorney, Agent, or Firm—T. L. Peterson

[57] ABSTRACT

A phase-locked loop for the color subcarrier signal in a television receiver is opened for non-sychronizable signals and the voltage controlled oscillator oscillates on a predetermined frequency. The lock in characteristic of the phase-locked loop is thereby improved.

3 Claims, 1 Drawing Figure

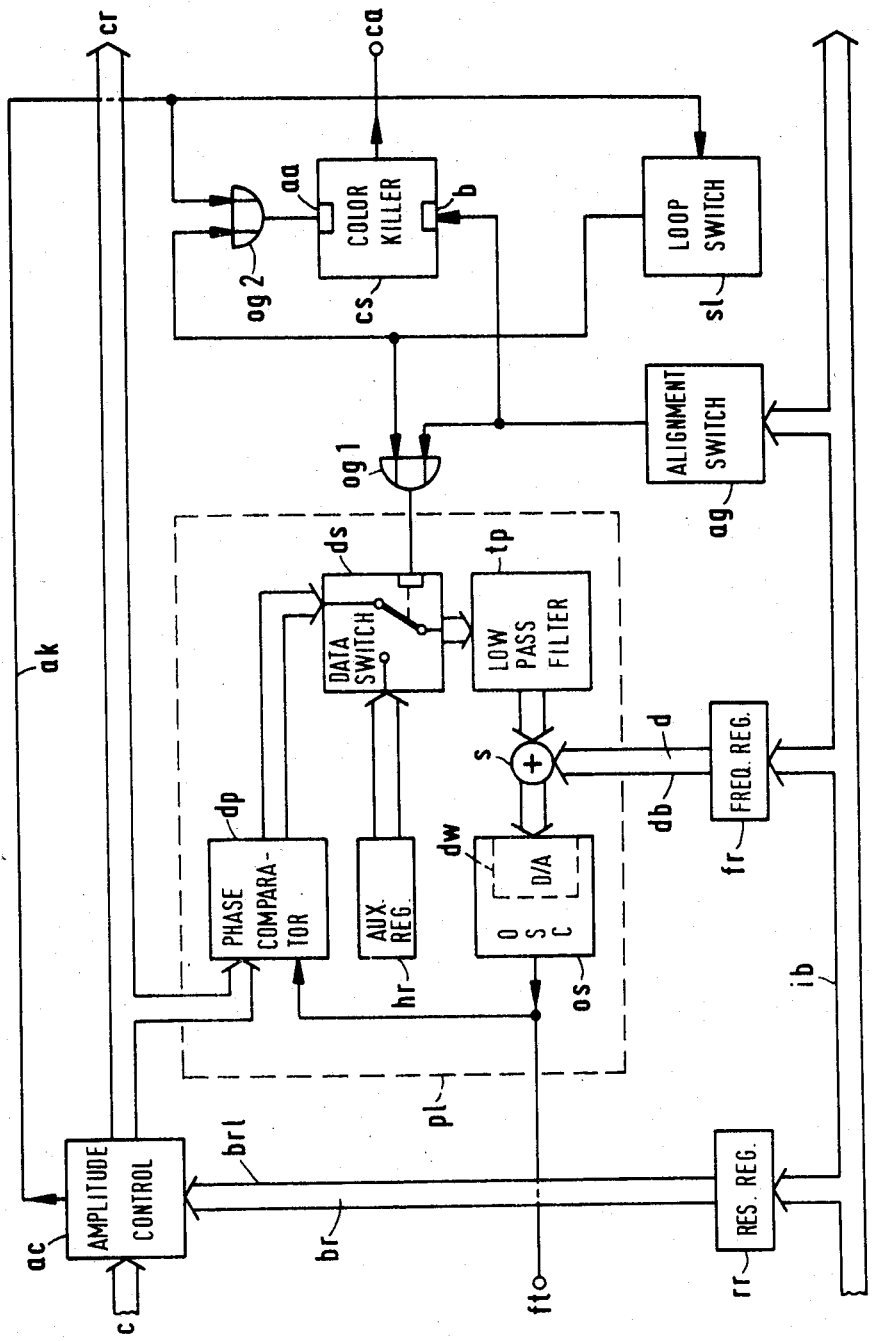

COLOR-TELEVISION RECEIVER WITH AT LEAST ONE INTEGRATED CIRCUIT FOR PROCESSING THE DIGITIZED COMPOSITE COLOR SIGNAL

BACKGROUND OF THE INVENTION

The invention pertains to color-television receiver circuits, in general, and to a phase-locked-loop (PLL) for the color subcarrier signal in a television receiver, in particular.

The present invention relates to a color-television receiver with at least one integrated circuit for processing the composite color signal digitized by means of a clock signal, the digital chrominance signal being locked to the chrominance-subcarrier frequency by means of a phase-locked loop. The integrated circuit includes a frequency- and phase-controllable chrominance-subcarrier oscillator forming part of the phase-locked loop and generating the clock signal for the digital processing. It also includes a color killer for inhibiting color reproduction; an alignment switch opening the phase-locked loop for frequency alignment, the alignment data being transferred over a data bus and stored in a frequency register, and a burst amplitude control circuit regulating the burst amplitude at the value of a burst reference and, if this value is not reached, inhibiting color reproduction via the color killer.

A color-television receiver of this kind is described in a data book by Intermetall Semiconductors ITT, "Digit 2000 VLSI Digital TV System", Edition 1984/5, pages 76 to 80. In this arrangement, the phase-locked loop can be opened, e.g., in the test shop, for alignment purposes by entering control and alignment data from outside over the data bus. During operation, the phase-locked loop remains closed. During reception of standard color-television signals, the phase-locked loop locks to the chrominance-subcarrier frequency contained in the burst signal, the frequency of the chrominance-subcarrier oscillator being four times the chrominance-subcarrier frequency. In the presence of nonstandard color-television signals, particularly if there is no or only a very small burst signal, as is the case, for example, with video games or home computers connected to the television receiver, but also during reception of pure monochrome signals without burst, the burst amplitude control circuit tries to amplify the noise or other components contained in the composite color signal to such a level that the phase-locked loop can lock to them. As a result, the phase-locked loop, having acquired lock with these components, leaves the desired frequency and, depending on the interfering frequency contained in the composite color signal, may be detuned up to the limit of the capture range.

If the color-television receiver is then switched to a channel on which a standard color-television signal is present, the phase-locked loop will not return to the phase-locked mode in some cases, particularly if the alignment frequency of the open phase-locked loop differs from the desired frequency due to component aging, temperature variations or imperfect alignment and, thus, takes up a portion of the capture and lock range of the phase-locked loop, thereby rendering the useable control range of the loop frequency unsymmetrical and narrowing it unilaterally. As a result of this loop behavior, the color reproduction is either inhibited or does not stabilize immediately but only after a considerably time.

SUMMARY OF THE INVENTION

One object of the invention is to provide a color-television receiver which permits immediate stable color reproduction when switched from a nonstandard color-television signal to a standard color-television signal.

To solve this problem, in accordance with the invention the phase-locked loop for the chrominance subcarrier signal is designed to be open in the presence of burst signals not worthy of reception, with the chrominance-subcarrier oscillator at its alignment frequency.

One of the advantages offered by the invention is that, in order for the phase-locked loop to acquire lock regardless of the frequency of the interfering signals, only the difference between the alignment frequency and the desired frequency has to be overcome. Another advantage is the use of an existing amplitude control signal for opening the phase-locked loop. Additional signals which indicate whether or not the phase-locked loop is locked to the chrominance-subcarrier signal, particularly in the case of multistandard sets, can be easily combined by means of additional logic circuits and used to control the opening of the phase-locked loop. A further advantage is that the burst reference can be altered via the data bus, so that the opening of the phase-locked loop on the basis of the comparison between the burst amplitude and the burst reference is alterable, too.

BRIEF DESCRIPTION OF THE DRAWING

The invention will now be explained in more detail with reference to the accompanying drawing, which is a block diagram of an embodiment of a phase-locked loop with a color killer in accordance with the invention.

DETAILED DESCRIPTION

The drawing shows a phase-locked loop for a digitized chrominance signal which basically corresponds to the phase-locked loop described in the above-mentioned reference and has been supplemented by the subcircuits in accordance with the invention. The digitized chrominance signal c is fed to the burst amplitude control circuit ac. The burst amplitude control circuit ac is connected by the first data line brl to the reference register rr in such a way that the data of the latter is transferred as burst reference br into the burst amplitude control circuit ac. The amplified chrominance signal cr appearing at the output of the burst amplitude control circuit ac is fed to the phase comparator dp and to further stages of the color-television receiver, which are of no interest here. The data switch ds, whose control input is connected to the output of a first OR gate og1, has its first data input and its second data input connected to the outputs of the phase comparator dp and the auxiliary register hr, respectively.

The output of the data switch ds is coupled to the input of the low-pass filter tp, whose output is fed to the data-summing stage s. The latter is also supplied with data (data word d) from the frequency register fr over the second data line db, and its output is connected to the digital-to-analog converter dw of the chrominance-subcarrier oscillator os. The output of the latter provides the system clock ft, which, on the one hand, serves as the master clock for the digital color-television receiver and, on the other hand, is applied to an additional input of the phase comparator dp. The output of the alignment switch ag is connected to one of the two inputs of the first OR gate og1 and to the "color on" input b of the color killer cs, whose output signal is the color kill signal ca.

The "color off" input aa of the color killer cs is connected to the output of the second OR gate og2. The output of the loop switch sl is coupled to the second input of the first OR gate og1 and to one of the two inputs of the second OR gate og2. The amplitude control signal ak delivered by the burst amplitude control circuit ac is applied to the second input of the second OR gate og2 and to the input of the loop switch sl. The data bus ib is connected to the data inputs of the reference register rr, the frequency register fr, and the alignment switch ag.

In this embodiment, the chrominance signal c is digitized in a preceding analog-to-digital converter (not described here) under control of the system clock ft. This signal c is fed to the burst amplitude control circuit ac, in which the burst amplitude of the composite color signal is compared with the usually higher burst reference br and, in case of disagreement, adjusted until it equals the burst reference br. The preamplified chrominance signal cr is fed to the phase comparator dp, which compares the instantaneous burst voltages digitized under control of the system clock ft. It thus determines the phase difference between the system clock ft and the burst signal, and this phase difference is fed as a phase-difference signal to the data switch ds. The low-pass filter tp, which is connected to the data switch ds and whose frequency response is optimized for the phase-locked loop pl, delivers its output signal to the data-summing stage s. There, the data word d stored in the frequency register fr for frequency alignment is added, and the sum signal is fed to the chrominance-subcarrier oscillator os. In the latter, the digital-to-analog converter dw converts the data to an analog voltage for frequency alignment. The output signal of the chrominance-subcarrier oscillator os, i.e., the system clock ft, is fed to the digital circuits processing the composite color signal, i.e., also to the phase comparator dp. The phase-locked loop pl is thus closed.

When the gain exceeds a limit value in the burst amplitude control circuit ac, the latter provides the amplitude control signal ak to the "color off" input aa of the color killer cs and to the input of the loop switch sl. Color reproduction is thus inhibited via the color kill signal ca, and the phase-locked loop pl is opened via the data switch ds, which, instead of applying the phase-difference signal to the low-pass filter tp, now transfers to the low-pass filter tp the contents of the auxiliary register hr, which correspond to a zero phase difference. Thus, the control signal applied to the chrominance-subcarrier oscillator os, i.e., the sum signal delivered by the data-summing stage s, is only the data word db from the frequency register fr, so that the oscillator oscillates at the alignment frequency.

To align the frequency of the phase-locked loop pl, the alignment switch ag is activated over the data bus ib to open the data switch ds and provide a control signal to the "color on" input b of the color killer cs. The contents (data word d) of the register fr can now be altered via the data bus ib. During reception of a composite color signal containing a color test pattern, the alignment frequency can be so adjusted, e.g., during a service test, that interference beats and spurious color in the color bars of the test pattern are kept to a minimum.

The circuit according to the invention, using exclusively digital subcircuits, is particularly suited to integration with insulated-gate field-effect transistors, i.e., in so-called MOS technology, but it is, of course, also possible to use bipolar techniques, which are particularly suitable for digital circuits.

What is claimed is:

1. A color television receiver having circuits for processing a composite color signal digitized under control of a clock signal, comprising:

first means for receiving a digital chrominance signal from color-television signals and including a burst signal having a burst amplitude and a chrominance subcarrier frequency;

a phase-locked loop including a frequency and phase controllable chrominance subcarrier oscillator;

said phase locked loop being locked in a phase-locked mode to the chrominance subcarrier frequency contained in the burst signal during reception of color-television signals, said oscillator oscillating at an integral multiple of said chrominance subcarrier frequency in the phase-locked mode, said oscillator generating said clock signal;

a color killer which generates a color kill signal which is used to inhibit color reproduction;

second means for opening or unlocking said phase locked loop from said phase-locked mode including first switch means connected in said phase-locked loop, an alignment switch having an output coupled to said first switch means and to a color inhibit input of said color killer, a loop switch having an input coupled to a burst amplitude control circuit and an output coupled to said first switch means and to a color enable input of said color killer;

third means for digitally adjusting the frequency of said oscillator coupled to said phase locked loop;

said first means including said burst amplitude control circuit providing a gain for regulating the burst amplitude to a burst reference value and for providing a control signal when said gain exceeds a predetermined gain;

said second means being responsive to said control signal to open said phase locked loop, causing said oscillator to oscillate at a predetermined alignment frequency, and cause said color killer to inhibit color reproduction by generating said color kill signal;

said burst amplitude control circuit being responsive to the burst signal having a predetermined amplitude relative to said burst reference value to cause said second means to close said phase locked loop enabling said phase-locked mode, causing said oscillator to switch back to the phase locked mode, and causing said color killer to enable color reproduction by terminating said color kill signal.

2. A color television receiver in accordance with claim 1, comprising:

a data bus;

a reference register receiving said burst reference from said data bus and coupled to said burst amplitude control circuit;

a frequency register which is connected to said data bus and has outputs coupled to said chrominance-subcarrier oscillator, whereby said oscillator can be adjusted to said alignment; and said alignment switch having inputs coupled to said data bus.

3. A color television receiver in accordance with claim 2, wherein:

said alignment frequency is an integral multiple of said chrominance subcarrier frequency and is at the center of the lock range of said phase-locked loop.

* * * * *